US 6,671,501 B1

(12) United States Patent
Dalichau (10) Patent No.: US 6,671,501 B1
(45) Date of Patent: Dec. 30, 2003

(54) SIGNAL TRANSMISSION CIRCUIT (75) Inventor: Harald Dalichau, Munchen-Waldperlach (DE)

(73) Assignee: Polytrax Information Technology, Munich (DE)

( * ) Notice: Subject to any disclaimer, the term of this patent is extended or adjusted under 35 U.S.C. 154(b) by 0 days.

(21) Appl. No.: 09/561,827

(22) Filed: Apr. 28, 2000

(30) Foreign Application Priority Data

Apr. 30, 1999 (DE) .......................................... 199 19 901

(51) Int. Cl.$^7$ ................................................ H04B 1/04
(52) U.S. Cl. ...................... 455/120; 455/120; 375/222; 336/145; 379/93
(58) Field of Search ..................... 455/120; 340/310.01; 375/222; 336/145, 148, 173, 182; 379/93

(56) References Cited

U.S. PATENT DOCUMENTS

| 4,142,178 | A | * | 2/1979 | Whyte et al. | ............... 307/149 |
| 4,378,472 | A | * | 3/1983 | Lechner | ...................... 370/285 |
| 4,597,082 | A | | 6/1986 | Hill et al. | |
| 4,903,006 | A | | 2/1990 | Boomgard | .............. 340/310 A |
| 5,644,286 | A | * | 7/1997 | Brosh et al. | ........... 340/310.01 |
| 5,777,769 | A | * | 7/1998 | Coutinho | ............... 340/310.01 |
| 5,864,284 | A | * | 1/1999 | Sanderson | ............. 340/310.01 |
| 5,870,016 | A | * | 2/1999 | Shrestha | ................ 340/310.01 |
| 6,014,386 | A | * | 1/2000 | Abraham | ............... 340/310.01 |
| 6,040,759 | A | * | 3/2000 | Sanderson | ............. 340/310.01 |
| 6,151,480 | A | * | 11/2000 | Fischer et al. | ......... 340/310.01 |
| 6,178,514 | B1 | * | 1/2001 | Wood | ......................... 713/300 |
| 6,212,658 | B1 | * | 4/2001 | Le Van Suu | ........... 340/310.01 |

FOREIGN PATENT DOCUMENTS

| DE | 4003653 | | 2/1990 | |
| EP | 0610880 A1 | | 8/1994 | |
| JP | 61090535 | | 5/1986 | |
| WO | WO 98/40980 | * | 9/1998 | ............. H04J/1/00 |

OTHER PUBLICATIONS

SGS–Thomson Microelectronics, "Power Line Modem Application ST7537," Joel Huloux and Laurent Hanus, 1995, 32 pp.

* cited by examiner

Primary Examiner—William Trost
Assistant Examiner—Stephen D'Agosta
(74) Attorney, Agent, or Firm—Dorsey & Whitney LLP (57) ABSTRACT The present circuit serves for the transmission of information signals over the general electricity supply mains. It has a transducer (13) for the galvanic separation of the mains voltage. The mains side winding (L1) of the transducer is connected in series with a capacitor (C1) in order to separate the mains frequency from the frequency of the information signal. It is loosely coupled with the windings (L2, L3) of the transducer, being galvanically separated from the mains with a coupling degree between 0.8 and 0.98, whereby the transducer obtains a desired mains side stray inductance. The circuit is dimensioned so that it has a low impedance at the mains, when it is sending, and a high impedance, when it is receiving, that it provides a high level of the reception signal at the application side terminal and that it has a broadband balanced frequency response, which is largely independent of fluctuations of the mains impedance within a broad frequency range.

6 Claims, 6 Drawing Sheets

SIGNAL TRANSMISSION CIRCUIT

FIELD OF THE INVENTION

The invention relates to a transmission circuit for transmitting electric signals over a transmission medium such as the general electricity supply mains, which is subject to strong impedance fluctuations and interferences.

BACKGROUND OF THE INVENTION

For the transmission of electronic signals in the monitoring and control of electric and electronic devices and machines, for providing telephone, email and Internet connections and for other data networks usually special lines are respectively laid. Because of the corresponding expense it has been tried on various occasions to use the already present lines of the general electricity supply mains for data transmission. For the low voltage part (in Central Europe: 230V, 50 Hz) of the electricity supply mains the European standard CENELEC EN50065 provides frequency bands A to D with 9 to 95, 95 to 125, 125 to 140 and 140 to 148.5 KHz for information transmission. In the USA or in Japan frequency ranges of up to 500 KHz are available. In the future the availability of frequencies of up to 30 MHz is expected.

A conventional system for data transmission over the electricity supply mains is disclosed in Application Note AN 655 of the company SGS-Thomson, http://www.st.com. This system has a modem for generating and receiving the signals to be transmitted by frequency modulation at frequencies of about 131 and 133 KHz. The coupling of the modem with the mains is accomplished by a transmission circuit, in which a transformer provides a galvanic separation from the mains.

The transformer in such systems is usually connected to capacitors, so that it forms a small bandwidth filter for the used frequencies. Thus on the one hand the harmonics of the signal generated by the modem and on the other hand the mains frequency of 50 Hz or 60 Hz and various interferences of the mains are to be filtered out.

Another transmission circuit for the data transmission over the electricity supply mains is disclosed in Wo 98/40980. It comprises an air transformer, which is connected so that an as good as possible matching with a particular mains impedance results.

A basic circuit diagram for communication over the electricity supply mains is also shown in DE-C-4003653.

However, with the known systems only a limited transmission rate is attainable. This is caused by the considerable interference voltages and dampings of the electricity supply mains. Accordingly, the system of SGS-Thomson only obtains a transmission rate of 1200 bits per second.

SUMMARY OF THE INVENTION

The object of the invention is to provide a circuit, which allows a signal transmission over the electricity supply mains with high transmission speed, which is less susceptible to interferences.

This object is met by the transmission circuit disclosed in claim 1. The subclaims are related to preferred embodiments of the present invention.

The electricity supply mains has typical ohmic impedances of 1Ω to 100Ω in the frequency range of interest of up to 150 or 500 KHz or in the future of up to 30 MHz, depending upon the country. The inductive impedances can be very high and lead to phase angles between current and voltage of 45°, in some cases of up to nearly 90°. The invention achieves a high-speed data transmission, which is insensitive to interferences by a transmission circuit, which is coupled to the electricity supply mains, so that the signal level is largely insensitive with respect to the common fluctuations of the mains impedance.

Preferably at each frequency in the used frequency range the change of the level of the transferred signal should be at most 3 dB, more preferably at most 2 or 1.5 dB, at a change of the mains impedance in the range of the mains impedance to be expected in practice.

In some embodiments, the transmission circuit, which serves for the galvanic separation from the electricity supply mains is designed as a broadband transmission circuit. Here, this means a 3 dB bandwidth of preferably at least ±10%. The broadband characteristic causes a flat course of the transferred signal level with a change of the signal frequency and thus a low dependence of the signal level with respect to the signal frequency. It enables the simultaneous use of many frequencies within a broader frequency range, e.g. within one or several of the frequency bands A to D of the CENELEC standard. By doing so, the signals can be transmitted by two-sideband modulation with one or several carrier frequencies. Thus much more information can be simultaneously transmitted than with a small-bandwidth transmission circuit. This way, data transmission rates can be achieved, which are comparable to ISDN.

The danger of receiving more interference signals because of the large bandwidth and thus of causing transmission errors proves to be insignificant, because many interference signals on the electricity supply mains are only Very short or limited to narrow frequency ranges. Therefore, they can be easily corrected by the receiver, when the high transmission rate allowed by the invention is also used for the transfer of error correction codes, where this is necessary.

The broad bandwidth feature of the transmission circuit also allows to dispense with a matching with the desired frequency range at the time of production.

The broad bandwidth feature should be maintained with any mains impedances occurring in practice. For the individual mains impedances the respective transfer function should decrease by at most 3 dB, preferably by at most 2 or 1.5 dB over the used frequencies.

Embodiments of the present invention are specially useful for the galvanic separation from the electricity supply mains. As an alternative to the inductive transducer (transformer) also a mains connection circuit with mostly capacitive coupling is conceivable, however.

Other embodiments, with a loose coupling between the first and the second winding, have the advantage that also with windings with few turns and thus little ohmic resistance a certain stray inductance occurs. The stray inductance is approximately the inductance of the transducer measured at the first winding which results, when there is a short circuit of the second winding. As will be discussed in detail further below, the stray inductance has a favourable influence on the frequency response. In the present connection there is a loose coupling at coupling rates of 0.98 and below. Coupling rates of less than 0.8 can result in a strong alternation of the transmitted signal, though. Preferred coupling rates therefore are between 0.8 and 0.98 or more preferably between 0.88 and 0.96. Loose couplings in the mentioned region can simply be achieved by a transducer having a core with a gap. The gap also renders the magnetic properties of the core largely independent of temperature fluctuations and sample variations. The desired stray inductance at the side of a winding can at a stronger coupling also be achieved by a correspondingly dimensioned additional inductance in series with the respective winding.

The first capacitance in some embodiments forms in conjunction with the inductance of the first winding a high pass for the separation of the lower mains frequency of 50 Hz or 60 Hz from the frequencies of the received signals.

Other features further contribute to avoid a strong damping of the sent signal at very low mains impedances. This is due to the fact, that the capacitance in some embodiments can form a resonance circuit with the stray inductance at a low mains impedance of about 1Ω, the resonance circuit providing a sufficient signal level at the mains but being sufficiently broadband, so that it does not deteriorate the frequency response. Because the cost of passive devices is approximately proportional to the volumes, the least expensive embodiment results, when the transducer and the capacitance have about the same structural volume, while the stray inductance and the capacitance satisfy the resonance condition. The features of: other embodiments, according to which the first winding of the transducer has a lower ohmic inner resistance also results in high signal levels at low mains impedances.

Other embodiments result in or relate to an amplification of the signal levels of the received signals. claim 10 relates to the use of the transmission circuit in a system for the transmission of digital data.

BRIEF DESCRIPTION OF THE DRAWINGS

Embodiments of the invention are explained along with comparative examples with respect to the drawings.

DETAILED DESCRIPTION OF THE DRAWINGS

Figure 1:
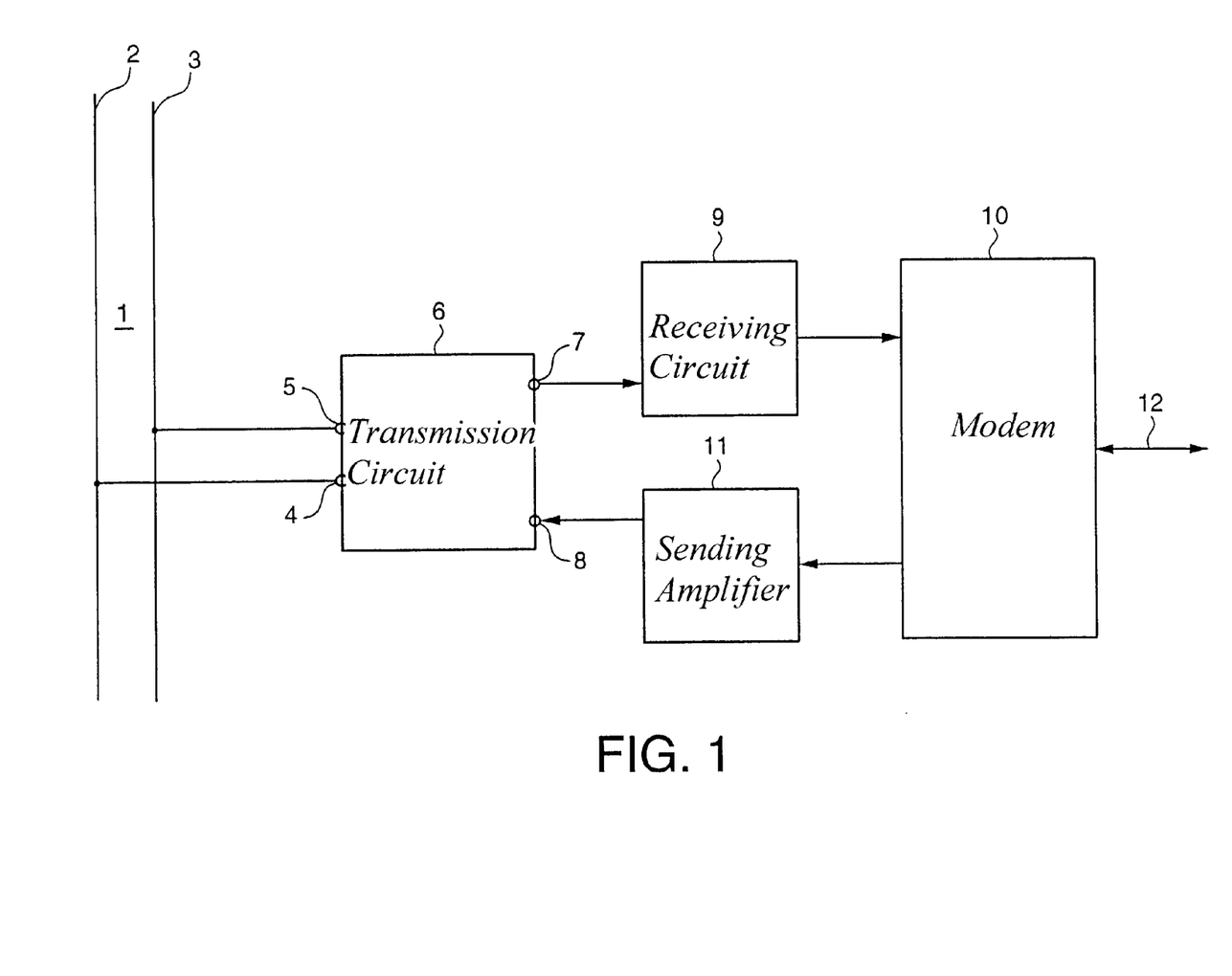
FIG. 1 is a block circuit diagram of a system for the transmission of digital data over the general electricity supply mains using a transmission circuit according to the invention.

The system shown in FIG. 1 can send and receive digital data over the general electricity supply mains 1. The electricity supply mains 1 is a low voltage mains with 230V and 50 Hz. At the neutral conductor 2 and a phase line 3 of the mains 1 a mains side terminal 4, 5 of a transmission circuit 6 is respectively connected, which galvanically separates the other parts of the system from the mains 1, and which, on the other hand, transfers signals which are modulated with the digital data from the mains 1 to a first application side terminal 7 and in opposite direction from a second application side terminal 8 to the mains. The first application side terminal 7 is connected to a modem 10 by a receiving circuit 9 having a receiving amplifier. The modem 10 is also coupled via a sending amplifier 11 with a second application side terminal 8 of the transmission circuit 6. For the input and output of the digital data the modem 10 has a data line 12.

The transmission circuit 6, the receiving circuit 9, the sending amplifier 11 and the modem 10 are also coupled to a not shown reference potential (ground).

The modem 10 receives data to be transmitted from the data line 12 and generates a correspondingly modulated signal in the frequency range of the CENELEC standard, that is for example in the frequency range of 110 KHz±15 KHz or 122 KHz±28 KHz. The modulated signal is fed via the sending amplifier 11 to the transmission circuit 6 which overlays it over the voltages on the mains 1. The modem 10 applies a two-sideband modulation with one or several carrier frequencies, which uses the indicated frequency ranges as completely as possible for the transmission of the data.

Signals in the indicated frequency ranges, which are also transmitted over the mains 1 by an equivalent system are separated from the mains frequency of 50 Hz in the transmission circuit 6 and transferred over the receiver circuit 9 to the modem 10, which by demodulation acquires the data contained therein and outputs them to the data line 12.

Figure 2:
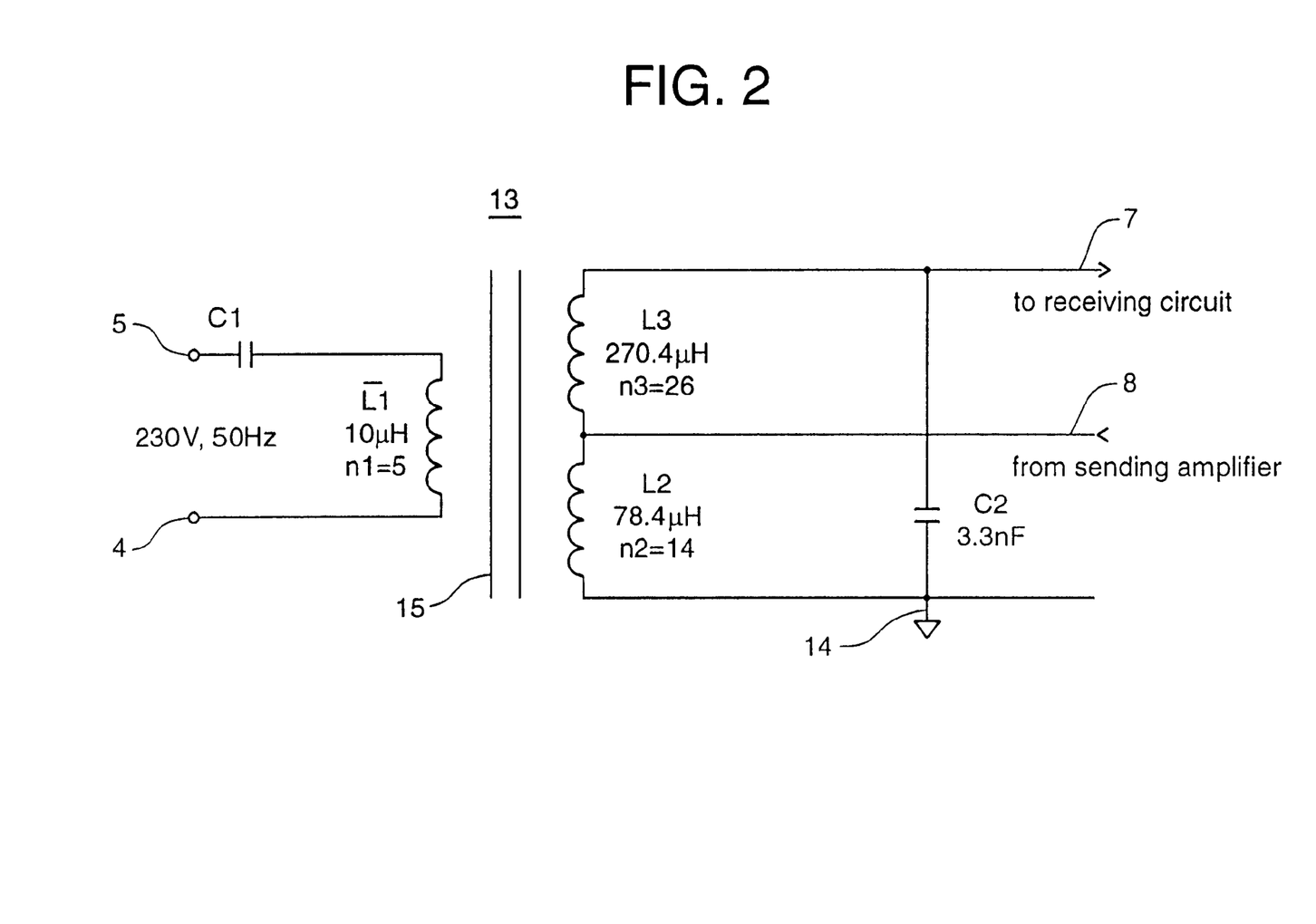
FIG. 2 is the circuit diagram of the transmission circuit.

FIG. 2 shows the circuit diagram of the transmission circuit 6. It contains an inductive transducer 13 (transformer) for the galvanic separation of the mains side terminals 4, 5 on the one hand from the application side terminals 7, 8 on the other hand. The transducer 13 also serves for the transfer of signals sent to the mains and received from the mains from the sending amplifier 11 and to the receiving circuit 9.

The transducer 13 has a first winding L1 disposed in series with a first capacitor C1 between the mains side terminals 4, 5. Being galvanically separated from the first winding L1, it also has a series circuit of a second winding L2 and a third winding L3 between a ground terminal 14 and the first application side terminal 7, which is connected to the receiving circuit 9. The connection point between the second and the third winding is connected to the second application side terminal 8, which leads to the sending amplifier 11. A second capacitor C2 is disposed in parallel to the series circuit of the second and third winding L2, L3.

The first capacitor C1 and the first winding L1 form a high pass for the separation of the signal frequencies of 110±15 KHz or 122±28 KHz from the mains frequency of 50 Hz. The second capacitor C2 forms a broad band resonance circuit for the signal frequencies together with the series circuit of the second and the third winding L2, L3.

The dimensioning of the circuit of FIG. 2 is done under the following aspects for the sending of the signals to the mains 1:

conventional sending amplifiers have output impedances of several ohms, whereas the mains impedance is frequently lower and can decrease to 1Ω or less. For impedance matching between the mains 1 and the sending amplifier 11 the first winding L1 should have less turns than the second winding L2: n1<n2. In the present embodiment an impedance transformation of about 1:6 is reached.

Standards such as the CENELEC standard prescribe maximum powers and maximum voltages for the signal transmission on the mains 1. In order to obtain the maximum allowable voltage of the transmitted signal also at low mains impedances, the internal resistance of the windings of the transducer 13 and specially the internal resistance of the first winding L1 should be much smaller than 1Ω and more preferably smaller than, 0.1Ω. Therefore, for the first winding L1 only n1=5 turns of copper wire with an ohmic resistance of about 0.03Ω are chosen.

Moreover, the windings L1 and L2 are only relatively loosely coupled with a coupling rate of less than 0.98. Thereby the transducer 13 acquires a certain stray inductance measurable at the winding L1, which in conjunction with the capacitor C1 can provide a balanced frequency response, i.e. a small dependence of the signal damping upon the signal frequency and upon the mains impedance.

The value of the stray inductance $L_{str}$ and of the capacitor C1 is selected so that within the frequency band used for the signal transmission in conjunction with the impedance of the mains the dependence of the transfer function upon the mains impedance gets as small as possible. With high mains impedances (about 100Ω) the series resonant circuit of C1 and $L_{str}$ is strongly damped, and the resonance hardly influences the transmission characteristics. However, at low mains impedances (about 1Ω) the resonance prevents a decline of the voltage of the signal transmitted to the mains 1. Because of the still remaining ohmic resistances the resonance characteristics of the resonance circuit always stay broadband.

Another criterion in the selection of the values of C1 and L1 results from the fact, that the cost of these devices is approximately proportional to their volume and that the latter is in turn proportional to the capacitance C1 and the inductances of the transducer 13, respectively, with given demands upon the abilities of isolation against the mains voltage. When the resonance frequency determined by the product of C1 and $L_{str}$ is fixed, the overall cost of the capacitor C1 and the transducer 13 can be minimised, when both have about the same structural volume.

With commercial devices these requirements are met with the inductances and numbers of turns shown in FIG. 2, a coupling degree of k=0.935 between the first and second windings L1, L2, a resulting stray inductance of 1.6 μH and a capacitance of the capacitor C1 of 2 μF.

Figure 3:
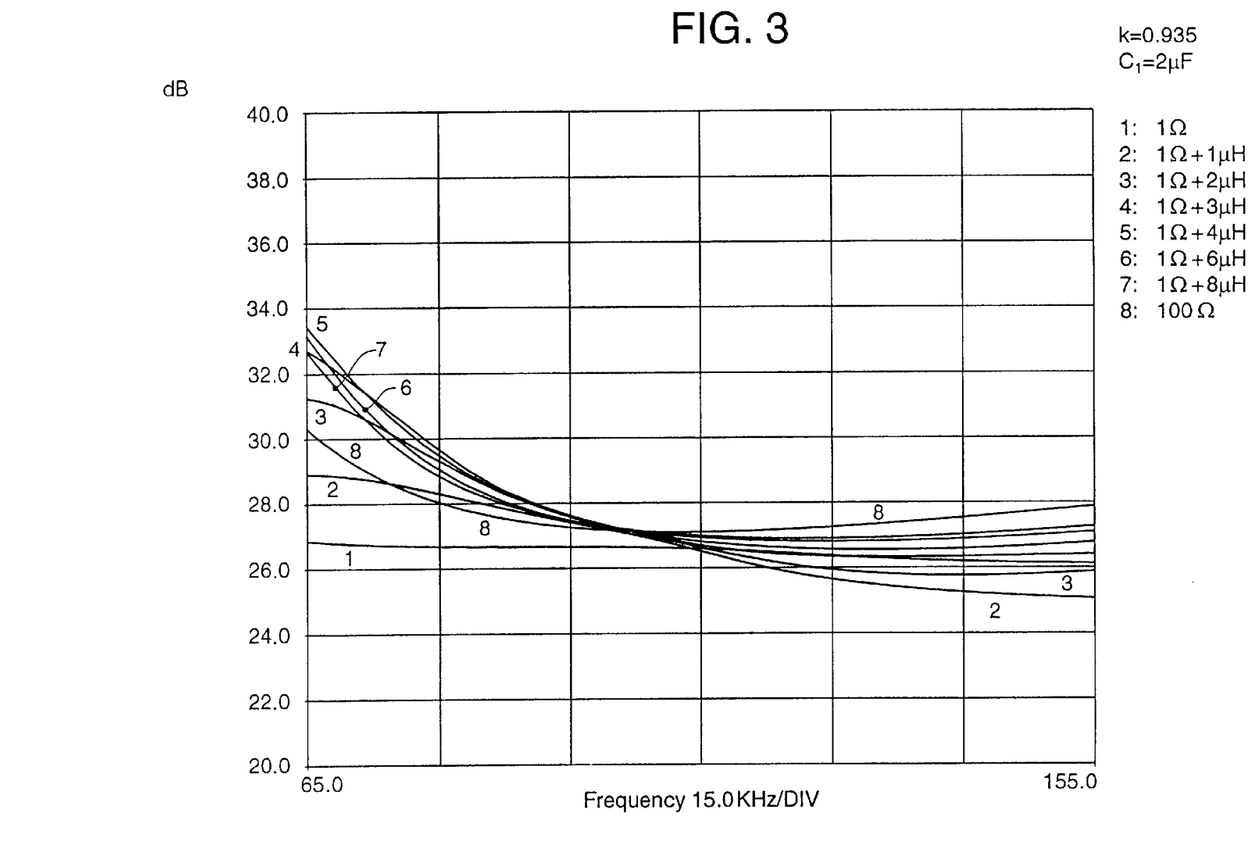
FIGS. 3 to 6 show the frequency responses of various transmission circuits according to the invention and according to comparative examples.

FIG. 3 shows the frequency response of the transmission circuit of FIG. 2 in the sending operation. At the abscissa the frequency of a signal of 65 to 155 KHz connected to the very low resistive sending amplifier at the application side terminal 8 is plotted with 15 KHz per division. At the ordinate the level (the amplitude) of the signals transferred from the transducer 13 and measured at the mains side terminals 4, 5 is plotted in dB with respect to an arbitrary reference voltage. The group of curves represents the frequency response for different mains impedances, which are indicated by the indices 1 to 8, namely for a purely ohmic impedance of 1Ω, a purely ohmic impedance of 100Ω and for impedances with an ohmic resistance of 1Ω and inductances of 1 μH to 8 μH.

Preferably, at each frequency in the range of ±15 KHz, that is about ±14% around the mean signal frequency of in this case 110 KHz, the change of the level of the transmitted signal at a change of the mains impedance in the range of mains impedances expected in practice should be at most 1.5 dB. For the individual mains impedances the respective transfer function should decrease by only 1.5 dB or less over the used frequencies (that is over 30 KHz or 28% of the average frequency in all). The 3 dB bandwidth of the transmission circuit should be at least ±10% of the centre frequency of smallest damping, this centre frequency being outside the used frequency range in the interest of an as low as possible dependence of the level of the emitted signal upon the mains impedance.

FIG. 3 shows that these values are very well met by the present embodiment. Even at still higher mains inductances than 8 μH no deterioration of the frequency response is to be expected, because the curves show that an increasing mains inductance does not lead to a spreading of the group of curves, the envelope rather being determined by the pure ohmic mains impedances (curves 1 and 8) and mains inductances of up to 3 μH (curves 2 to 4).

Figure 4:
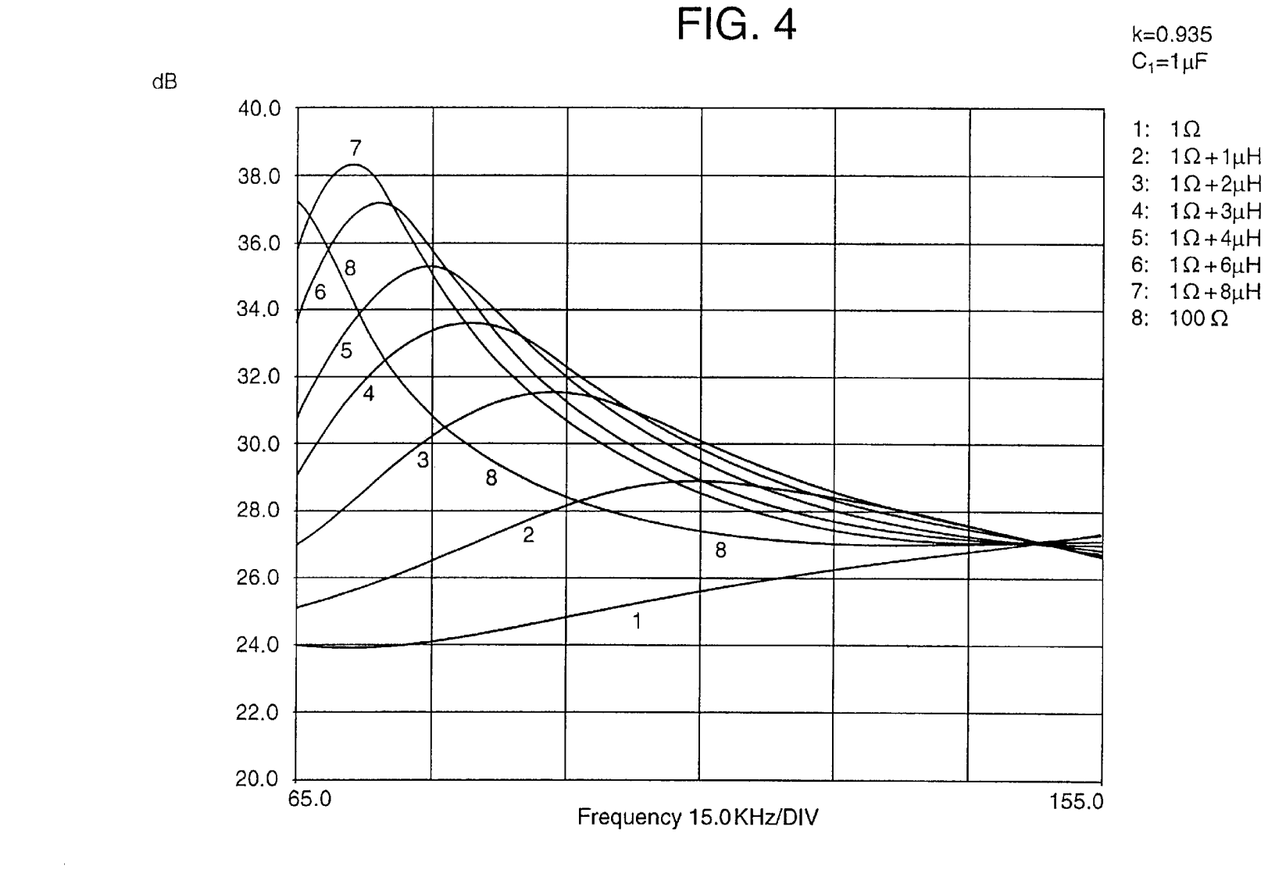

FIG. 4 shows in correspondence with FIG. 3 the transfer functions of a modification of the transmission circuit, at which the values of the capacitor C1 is decreased from 2 μF to 1 μF. Here the change of the signal level at a change of the mains impedance is at most about 7.5 dB and the maximum decrease of a transfer function is about 4 dB in the already indicated frequency range.

Figure 5:
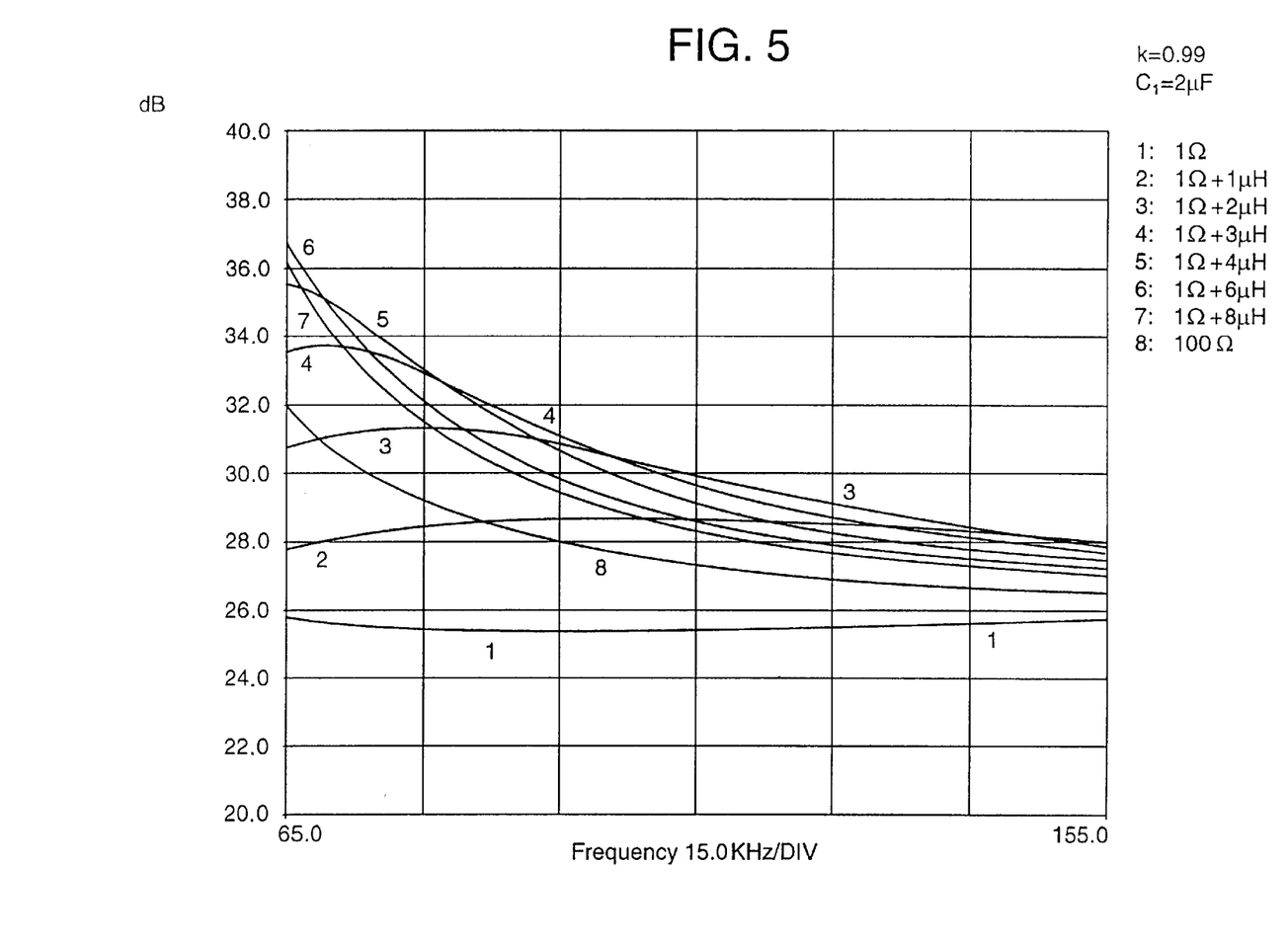

FIG. 5 shows the frequency response of another modification, in which the value of the capacitor C1 is kept at 2 μF whereas the degree of coupling k between the first and second windings L1, L2 is increased to 0.99. This results in a maximum level change of 5.5 dB and a maximum decrease of a transfer function of about 2.4 dB in the frequency range of interest. The values of FIGS. 4 and 5 are still acceptable for certain applications, where a two-sideband modulation is used which is less sensitive for damping changes, which result from impedance fluctuations of the mains and effect the entire frequency band evenly, than for differences in the damping between both sides of the frequency band at constant mains impedance.

Figure 6:
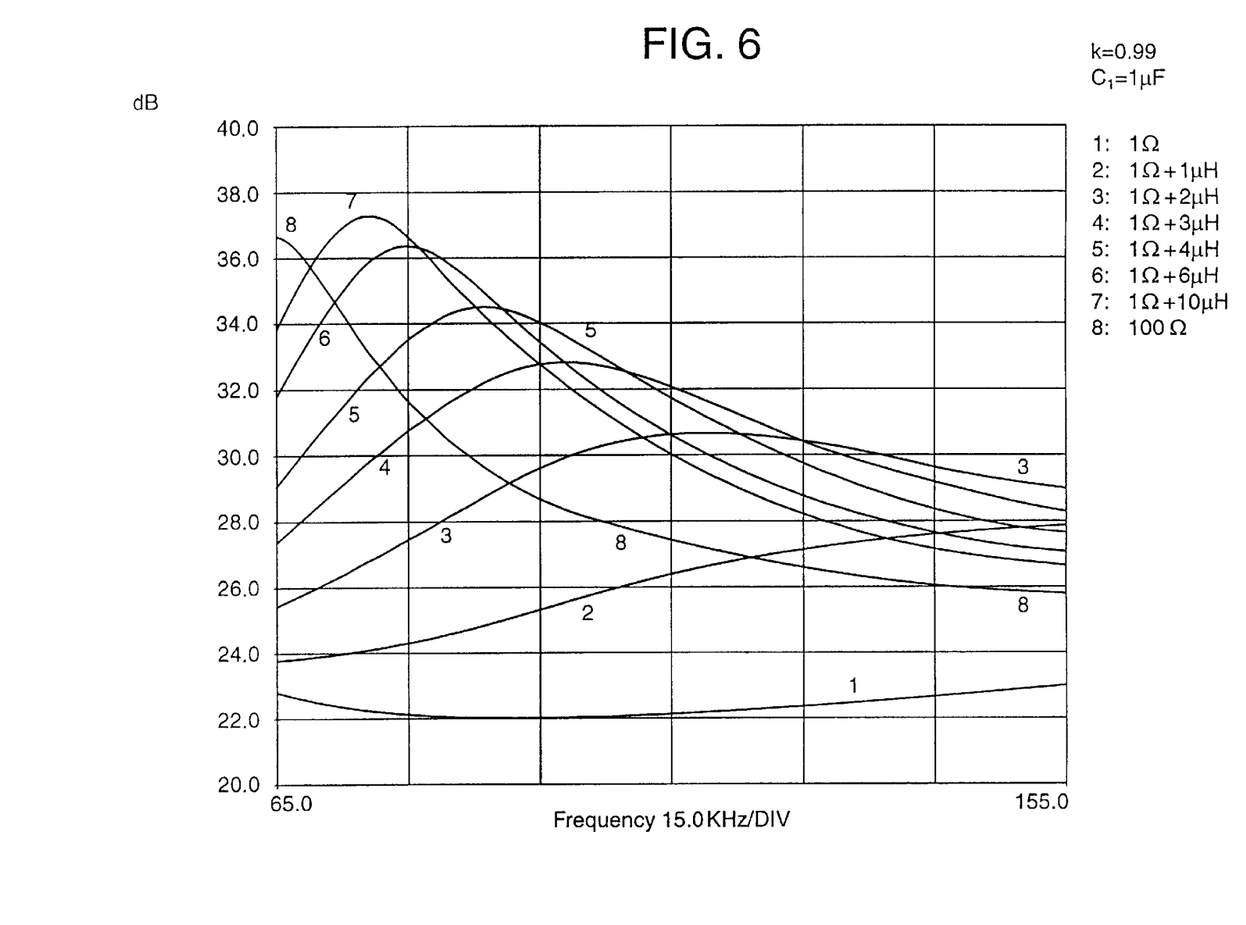

FIG. 6 shows the frequency response of a modification of the transmission circuit with a capacitance C1 of 1 μF and a coupling degree k of 0.99. In the frequency range of interest the maximum level change of the transmitted signal at the indicated possible changes of the mains impedance is almost 12 dB and the maximum decrease of the transfer function is almost 4 dB. Therefore, the thus modified circuit is hardly still suitable for emitting signals at high transmission speed and low error rates in the frequency range of interest.

For the dimensioning of the transmission circuit of FIG. 2 the following holds true with respect to or as high as possible sensitivity in the reception of signals from the mains 1:

A relatively high number of turns n3 of the third winding L3 (higher than n1 or n2) results in a voltage transformation of the first winding L1 to the series circuit of the second and third windings L2 and L3 and thus to a high signal voltage at the application side terminal 7.

The value of the capacitor C2 (here 3.3 μF) is dimensioned so that in conjunction with the parallelly connected inductance of the transducer 13 a resonance circuit with a resonance frequency in the range of the signal frequency results. Thus the transmission circuit has a relatively high impedance at the mains side terminals 4 and 5 in the receiving operation. Preferably, the sending amplifier is also connected with high resistance in the receiving operation.

If the receiving circuit 9, is very highly resistive at terminal 7, another resistor can be connected in parallel to the capacitor C2, in order to make the resonance of the resonant circuit consisting of the capacitor C2 and the transducer producer 13 broadband. The 1 dB bandwidth should preferably be at least equal to the frequency band used for the signal transmission.

The transducer 13 conveniently has an E-shaped core with a joke and an air gap 15. The air gap 15 renders the properties of the transducer 13 largely independent of sample fluctuations and temperature variations of the permeability of the core material (e.g. ferrite). Moreover, it results in the desired degree of coupling.

However, the gap should not be that large that stray fields are emitted or interference fields are received or that the degree of coupling decreases below about 0.88 or even below 0.8, because the transducer excessively damps the signal at such a loose coupling.

Moreover, the present transmission circuit 6 is dimensioned so that at the mains 1 it has a low impedance, when it is sending and a high impedance, when it is receiving that it provides a high level of the reception signal at the application side terminal 7 and that it has a broadband balanced frequency response, which is largely independent of fluctuations of the mains impedance within a broad frequency range.

The present invention may be embodied in other specific forms without departing from the essential spirit or attributes thereof. The described embodiments should be considered in all respects as illustrative, not restrictive.

What is claimed is:

1. A transmission circuit for transmitting signals of an application circuit within a predetermined frequency range over electricity supply mains, comprising:

an application side terminal for connecting to an application circuit;

a mains side terminal for connecting to the electricity supply mains; and an inductive transducer for transmitting the signals between the mains side terminal and the application side terminal with the terminals being galvanically separated, the inductive transducer having a first winding connected to the mains side terminal and a second winding connected to the application side terminal, the first and second windings loosely coupled at a coupling rate of between 0.8 and 0.98, the inductive transducer having such a stray inductance on the side connected with the mains side terminal that a level of the signals output to the electricity supply mains in the predetermined frequency range is substantially independent of fluctuations of impedance of the electricity supply mains.

2. The transmission circuit of claim 1, wherein between the inductive transducer and the mains side terminal, a first capacitance is connected in series with the first winding, and the stray inductance of the inductive transducer measured at the first winding and the first capacitance are dimensioned, so that for all mains impedances of interest virtually constant transfer characteristics result.

3. The transmission circuit of claim 2, wherein a structural volume of the first capacitance is approximately equal to a structural volume of the inductive transducer.

4. The transmission circuit of claim 1, wherein internal resistance of the first winding is lower than $1\Omega$.

5. The transmission circuit of claim 4, wherein internal resistance of the first winding is lower than $0.1\Omega$.

6. The transmission circuit of claim 1, wherein the first and second windings are loosely coupled at a coupling rate of between 0.88 and 0.96.

\* \* \* \* \*

UNITED STATES PATENT AND TRADEMARK OFFICE
CERTIFICATE OF CORRECTION

PATENT NO.   : 6,671,501 B1
DATED        : December 30, 2003
INVENTOR(S)  : Harald Dalichau It is certified that error appears in the above-identified patent and that said Letters Patent is hereby corrected as shown below:

Title page,
Item [73], Assignee, delete "Polytrax Information Technology" and insert
-- Polytrax Information Technology Aktiengesellschaft --

Column 2,
Line 33, delete "only Very short" and insert -- only very short --
Line 62, delete "alternation" and insert -- attenuation --

Column 3,
Line 22, delete "features of; other" and insert -- features of other --
Line 27, delete "claim 10" and insert -- Claim 10 --

Column 6,
Line 30, delete "to or as high" and insert -- to an as high --
Line 38, delete "3.3$\mu$ F" and insert -- 3.3 nF --
Line 46, delete "circuit 9, is" and insert -- circuit 9 is --

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,671,501 B1
DATED          : December 30, 2003
INVENTOR(S)    : Harald Dalichau It is certified that error appears in the above-identified patent and that said Letters Patent is hereby corrected as shown below:

<u>Title page,</u>
Item [56], References Cited, U.S. PATENT DOCUMENTS, -- U.S. Patent 4,310,829 -- should be added.

Signed and Sealed this

Fourteenth Day of September, 2004

JON W. DUDAS
*Director of the United States Patent and Trademark Office*